US011763237B1

(12) United States Patent
Rath

(10) Patent No.: US 11,763,237 B1
(45) Date of Patent: Sep. 19, 2023

(54) PREDICTING END-OF-LIFE SUPPORT DEPRECATION

(71) Applicant: SupportLogic, Inc., San Jose, CA (US)

(72) Inventor: Poonam Rath, San Jose, CA (US)

(73) Assignee: SupportLogic, Inc., San Jose, CA (US)

( * ) Notice: Subject to any disclaimer, the term of this patent is extended or adjusted under 35 U.S.C. 154(b) by 119 days.

(21) Appl. No.: 16/512,638

(22) Filed: Jul. 16, 2019

Related U.S. Application Data

(60) Provisional application No. 62/721,038, filed on Aug. 22, 2018.

(51) Int. Cl.
| | | |
|---|---|---|
| *G06Q 10/06* | (2023.01) | |
| *G06Q 10/08* | (2023.01) | |
| *G06Q 30/02* | (2023.01) | |
| *G06Q 10/0637* | (2023.01) | |
| *G06N 5/02* | (2023.01) | |
| *G06Q 10/04* | (2023.01) | |

(52) U.S. Cl.
CPC ......... *G06Q 10/06375* (2013.01); *G06N 5/02* (2013.01); *G06Q 10/04* (2013.01)

(58) Field of Classification Search
CPC ......... G06Q 10/06; G06Q 10/08; G06Q 30/02
USPC ...................................................... 705/7.37
See application file for complete search history.

(56) References Cited

U.S. PATENT DOCUMENTS

| | | | | |
|---|---|---|---|---|
| 6,832,205 B1* | 12/2004 | Aragones | ............... | G06Q 10/06 705/7.25 |
| 9,000,934 B1* | 4/2015 | Gordin | ................... | G06Q 10/20 340/635 |
| 9,473,637 B1 | 10/2016 | Venkatapathy et al. | | |
| 9,678,817 B1* | 6/2017 | Hasbun Pacheco | ......................... | G06F 11/0751 |
| 2003/0046250 A1* | 3/2003 | Kuettner | ................ | G06Q 30/02 705/400 |
| 2010/0198635 A1* | 8/2010 | Pirtle | ..................... | G06Q 10/04 705/7.41 |
| 2012/0143564 A1* | 6/2012 | Li | ....................... | G05B 23/0283 702/179 |
| 2012/0303412 A1* | 11/2012 | Etzioni | .................. | G06Q 30/06 705/7.31 |
| 2013/0268262 A1 | 10/2013 | Moilanen et al. | | |
| 2014/0188457 A1 | 7/2014 | Fink et al. | | |
| 2014/0245075 A1 | 8/2014 | Dhoolia et al. | | |
| 2015/0254687 A1* | 9/2015 | Konopka | ........... | G06Q 30/0202 705/7.31 |
| 2015/0254689 A1* | 9/2015 | Amemiya | ............ | G06Q 10/087 705/7.31 |
| 2016/0098480 A1 | 4/2016 | Nowson | | |
| 2016/0300135 A1* | 10/2016 | Moudy | .................... | G06F 40/30 |
| 2017/0061286 A1* | 3/2017 | Kumar | ............... | G06Q 30/0269 |

(Continued)

OTHER PUBLICATIONS

Office Action dated Sep. 25, 2020, from related U.S. Appl. No. 16/352,692.

*Primary Examiner* — Nga B Nguyen
(74) *Attorney, Agent, or Firm* — Dergosits & Noah LLP; Todd A. Noah

(57) ABSTRACT

Predicting end-of-life support deprecation is described. A system receives an identification of a product, and then identifies support request records associated with the product. The system identifies support information associated with the support request records. A predictive model uses the support information to predict a deprecation for the product. The system outputs the prediction of the deprecation for the product.

20 Claims, 3 Drawing Sheets

(56) References Cited

U.S. PATENT DOCUMENTS

| | | |
|---|---|---|
| 2017/0242919 A1 | 8/2017 | Chandramouli et al. |
| 2018/0131559 A1 | 5/2018 | Tapia et al. |
| 2018/0276061 A1* | 9/2018 | An .................... G06F 11/008 |
| 2018/0349795 A1* | 12/2018 | Boyle ................ G06Q 10/067 |
| 2019/0213605 A1* | 7/2019 | Patel ..................... G06N 5/048 |
| 2020/0004434 A1* | 1/2020 | Borlick ............... G06F 3/0683 |
| 2020/0043066 A1* | 2/2020 | Obaidi ............... H04L 63/0861 |

* cited by examiner

PREDICTING END-OF-LIFE SUPPORT DEPRECATION

CROSS REFERENCE TO RELATED APPLICATION

This application claims priority under 35 U.S.C. § 119 or the Paris Convention from U.S. Provisional Patent Application 62/721,038, filed Aug. 22, 2018, the entire contents of which is incorporated herein by reference as if set forth in full herein.

BACKGROUND

Companies sell a variety of products to customers, such as software, medical devices, consumer electronics, and other technical products, with each product being sold through a series of releases that have version names, numbers, or tags. Such products follow a lifecycle that include stages ranging from product introduction, to maturity, to deprecation, and to end-of-life. Usually after a product reaches a certain age, the company supporting the product makes a decision to deprecate support for the product. This decision is an important and inevitable part of a product's lifecycle management process. Decisions around the timing of product deprecation are usually made when a newer version of the product is released and/or when the revenue for a product no longer exceeds the product's associated costs. For example, after such a decision is made, a deprecated software product receives support for a period of 12 to 18 months during which customers are advised to migrate to newer versions of the software product. From a technical support viewpoint, minimal support may be provided for deprecated products that are nearing the end of their shelf life.

There is significant scope for cost savings in deprecating support for a product at the optimal time. Typically, this decision is arrived at by analyzing historical revenue numbers and revenue forecasts to predict per-unit profitability of the product. If the predicted profitability falls below a certain threshold, a decision is made to deprecate the product and eventually end support for the product. Typically, the decision to deprecate a product is made by a product management team. Often this decision is determined from a purely profitability standpoint, the underlying idea being that such a product should be managed on a growth-share matrix model to minimize allocated resources and maximize marginal profits. In other words, when a product's revenue is no longer predicted to be significantly greater than the marginal cost of maintenance, the supporting company makes a purely financial/capital-based decision to deprecate the product. On average, companies in the software industry deprecate the sequential versions of a software product every 12 to 18 months.

There have been some rudimentary machine learning models to predict when a product will reach the end of its life cycle. Many of the forecasting models are based on a product lifecycle model, where the x-axis marks the different expected stages of a product's lifecycle, such as early stage, maturity, and saturation, and the y-axis marks the product's sales trends for each stage. The typical method is to fit the sales data to a Gaussian curve (normal distribution) and project future sales over a period of time. Most of these analyses use sales data and changes in the trends of sales volumes.

DETAILED DESCRIPTION

Figure 1:
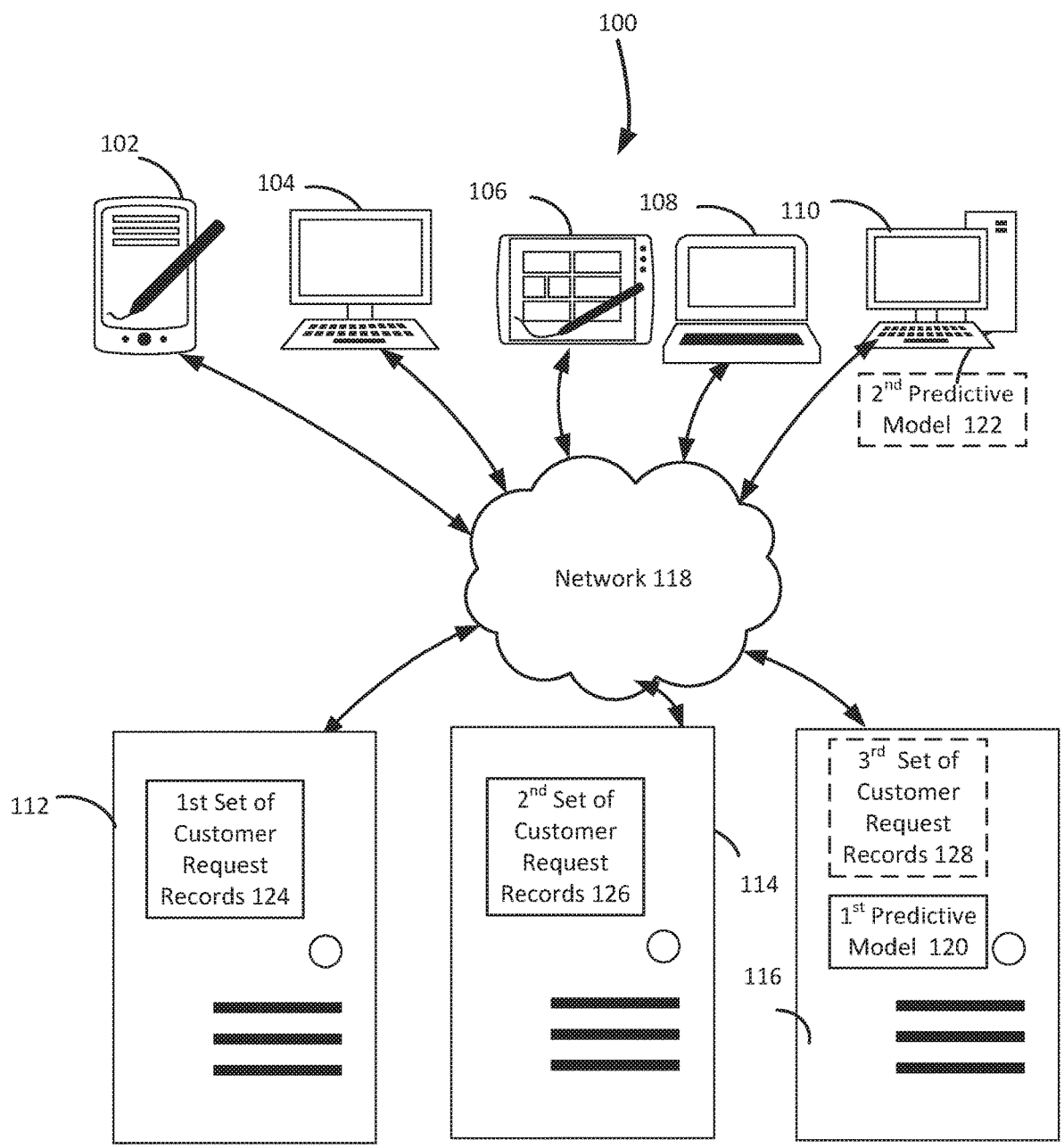
FIG. 1 illustrates a block diagram of an example system for predicting end-of-life support deprecation, under an embodiment.

The purely financial/capital-based perspective for end-of-life deprecation fails to take into account the various parts or dynamics that impact the health of a product in the marketplace. A product's health-related information is typically embedded in various parts of a business and can provide more enriching and impactful insights into whether or not a product is doing well. A company that provides product support to its customers uses support tickets, which are records of customers' requests for technical support. to capture the interactions of the company with its customers around managing technical issues related to supported products. Support tickets provide a wealth of data because they contain information about how a product is perceived and the extent of its usage over time.

While sales numbers and gross estimates of customer accounts can provide an aggregate overview of a product's penetration, support ticket data provides a more granular measure of how active and widespread the product is, along with the perception of the product which may be gleaned from the content of a support ticket's body. For example, a product may have been sold to 10 customers in 2015, but its usage may have declined for most of the customers, with only a few customers generating any recent support tickets. Furthermore, support tickets contain unevenly spaced time-series data that does not necessarily follow a typical Gaussian distribution. While there is a rise in support tickets and a decay over time, the resultant distributions are non-standard and require a more nuanced analytical approach than offered by the typical forecasting models that fits sales data to a Gaussian curve.

Embodiments herein enable predicting end-of-life support deprecation. A system receives an identification of a product. The system identifies support request records associated with the product. The system identifies support information associated with the support request records. A predictive model uses the support information to predict a deprecation for the product. The system outputs the prediction of the deprecation for the product.

For example, an administrator for Acme Corporation requests a prediction of the optimal time to deprecate Acme's spreadsheet software version 5.0. A prediction server receives this request and identifies support tickets for Acme's spreadsheet software version 5.0 that Acme generated in response to support requests from Acme's customers BigBiz and MegaCorp. The prediction server identifies support information from the metadata for the support tickets' timestamps and customer identifiers for Acme's spreadsheet software version 5.0, and extracts support information from the support tickets about installations, upgrades, and maintenance of Acme's spreadsheet software version 5.0. The prediction server's predictive model uses the support tickets' support information to estimate a 95% probability that the optimal deprecation for Acme's spreadsheet software version 5.0 will be in 9 to 12 months. The prediction server outputs this prediction with an explanation that this prediction of deprecation farther into the future than expected is based on the unusually large number of support tickets for Acme's spreadsheet software version 5.0 that are being generated 15 months after being installed for individual users at BigBiz and MegaCorp, even though the requested priority for these support tickets is slightly less than expected.

FIG. 1 illustrates a block diagram of an example system 100 for predicting end-of-life support deprecation, under an embodiment. As shown in FIG. 1, the system 100 may illustrate a cloud computing environment in which data, applications, services, and other resources are stored and delivered through shared data-centers and appear as a single point of access for the end users. The system 100 may also represent any other type of distributed computer network environment in which servers control the storage and distribution of resources and services for different client users.

In an embodiment, the system 100 represents a cloud computing system that includes a first client 102, a second client 104, a third client 106, a fourth client 108, a fifth client 110; and a first server 112, a second server 114, and a third server 116 that may be provided by a hosting company. The clients 102-110 and the servers 112-116 communicate via a network 118. The first server 112 may be referred to as the production server 112, the second server 114 may be referred to as the training server 114, and the third server 116 may be referred to as the prediction server 116, which can include and use a first predictive model 120. The fifth client 110 may be referred to as an administrator client 110 and can include and use a second predictive model 122. The production server 112 can include a first set of support request records 124, the training server 114 can include a second set of support request records 126 to train the first predictive model 120 and/or the second predictive model 122, and the prediction server 116 can include a third set of support request records 128 to respond to requests to predict product deprecation.

Even though FIG. 1 depicts the first client 102 as a smartphone 102, the second client 104 as a terminal 104, the third client 106 as a tablet computer 106, the fourth client 108 as a laptop computer 108, the fifth client 110 as a personal computer 110, and the servers 112-116 as servers 112-116, each of the system components 102-116 may be any type of computer system. The system elements 102-116 may each be substantially similar to the hardware device 300 depicted in FIG. 3 and described below. While FIG. 1 depicts the system 100 with five clients 102-110, three servers 112-116, one network 118, two predictive models 120-122, and three sets of support request records 124-128, the system 100 may include any number of clients 102-110, any number of servers 112-116, any number of networks 118, any number of predictive models 120-122, and any number of sets of support request records 124-128.

The system 100 receives an identification of a product. For example, an administrator for Acme Corporation uses the administrative client 110 to request a prediction of the optimal time to deprecate Acme's spreadsheet software version 5.0. The prediction server 116 can receive the request to predict product deprecation, or if the administrative client 110 includes the second predictive model 122, the administrative client 110. can receive the request to predict product deprecation. Consequently, either the prediction server 116 or the administrative client 110 can expose an interface to accept input data points that identify the product, such as data points that specify the name of the product and a time that may be used to determine the product's version name, number or tag. Such a queryable interface can include, but is not limited to, a REpresentational State Transfer (REST) Application Programming Interface (API), a Python API, a web API, or a web user interface.

The product may be a software product, a medical device product, a consumer electronics product, and/or a technical product. A software product can be a commercially manufactured item that is associated with a computer program. A medical device product can be a commercially manufactured item that controls and directs an electric current for the science of medicine. A consumer electronics product can be a commercially manufactured item that controls and directs an electric current for personal use. A technical product can be a commercially manufactured item that is associated with applied science.

After identifying a product, the system 100 identifies support request records associated with the identified product. For example, the prediction server 116 identifies support tickets for Acme's spreadsheet software version 5.0, in the first set of customer request records 124, which Acme generated in response to support requests from the clients 102-104 for Acme's customer BigBiz and support requests from the clients 106-108 for Acme's customer MegaCorp. The first set of customer request records 124 in the production server 112 includes the most recent support tickets generated by the clients 102-108, while the second set of customer request records 126 in the training server 114 may be an older copy of the first set of customer request records 124, and may have been used by the training server 114 at a previous time to train the first predictive model 120 and/or the second predictive model 122. The third set of customer request records 128 in the prediction server 116 may be a copy of the first set of customer request records 124 that may be accessed to respond to requests to predict product deprecation as an alternative to accessing the first set of customer request records 124 in the production server 112 to respond to requests to predict product deprecation The system 100 may be presented with input datapoints consisting of a product's name and a time, and then fetch the associated historical support ticket data for the specified product, which is the support tickets generated for the product and captured in the system's database. A support request record can be documentation of a solicitation for assistance.

The system 100 can group and aggregate products on multiple dimensions, which enables companies to gather insights ranging across hierarchical levels of granularity, from aggregated predictions for a product family, to a more granular prediction for each individual product down to its major and minor versions. Since the system's historical output can be captured and queried, companies can review how a group of products performed. Further, the application of natural language processing to support tickets can provide the ability to garner insights on typical issues and customer feedback related to a product. Additionally, some product families might show very different product health trends compared to other product families. For example, one product family may have had 5 version releases and all 5 may have performed poorly in terms of customer uptake.

Based on this example, it may not make sense for the manufacturing company to release newer versions for that product family before assessing whether a release is an improvement upon the prior versions. On the other hand, the output of the system 100 may infer that an older version of a product is doing better than a newer version of the product based on the features described below. In other words, through its data-driven approach, the system 100 can provide companies with enough information to break out of a pre-set pattern of product lifecycle management. The system 100 can surface these insights onto a product-specific webpage with a variety of visual representations in an interactive dashboard format.

The support request records associated with the product can include support request records generated for the product and/or support request records generated for another product that is associated with the product. For example, the prediction server 116 (or the administrative client 110) responds to a request to predict deprecation for Acme's spreadsheet software version 5.0 by identifying support tickets for Acme's spreadsheet software version 5.0, Acme's spreadsheet software version 4.0, Acme's spreadsheet software version 3.0, Acme's spreadsheet software version 2.0, and Acme's spreadsheet software version 1.0 in the third set of customer request records 128 (or the first set of customer request records 124).

Following identification of support request records, the system 100 identifies support information associated with the support request records. For example, the prediction server 116 (or the administrative client 110) identifies support information from the metadata for the support tickets' timestamps and customer identifiers for Acme's spreadsheet software version 5.0, and also extracts support information from the support tickets about installations, upgrades, and maintenance of Acme's spreadsheet software version 5.0. Support information can be data about assistance. Although this example describes support information that is compiled from support tickets, the system can also compile support information from customer relationship management data.

The prediction server 116 (or the administrative client 110) can extract timestamp-based information from a set of support request records to enable downstream aggregations on a pre-configured frequency such as, but not limited to, a weekly, monthly, or quarterly basis. Additionally, the prediction server 116 (or the administrative client 110) can use natural language processing techniques to analyze the text of the support tickets to capture references to the product, and its associated acronyms and synonyms. The prediction server 116 (or the administrative client 110) may use natural language processing techniques because in many support tickets the metadata fields are either left blank or erroneously completed due to user error. Analyzing the support ticket text for references to products enables the system 100 to capture accurate production usage information, even in situations where metadata is unavailable or incorrect.

The support information may include metadata associated with the support request records, with the metadata including an identifier of a customer of the product and/or a time associated with generating a support request record. The system 100 can use various types of metadata from support tickets to derive enriched information about product age and to extract usage patterns across various customers of the product. The support information may also include content extracted from the support request records, with the content including information associated with an identifier of an individual user of the product, a product installation, a product upgrade, product maintenance, and/or a support request priority. The system 100 can use natural language processing to process support ticket text and extract content that captures the correspondence between the end user of a product and the technical support agent, which can provide a more nuanced view of the product's usage than offered by sales data.

Metadata can be information that describes other information. Content can be the material that is included in something. An identifier can be a sequence of characters used to refer to an element. A customer can be a person or organization that buys a product from a business. A time can be a point measured in hours and minutes. Information can be data.

An individual user can be a single person who utilizes a product. A product installation can be the loading of a commercially manufactured item onto a device. A product upgrade can be adding or replacing components on a commercially manufactured item. Product maintenance can be the servicing of a commercially manufactured item. A support request priority can be the regarded importance of a solicitation for assistance.

The system 100 can use the data extracted from the support tickets that is relevant to the input datapoint to derive features such as the age of the product, text-derived features, topic-normalized severity/priority concentration, usage over time, customer count, and effective ticket count. The age of a product may be computed as time elapsed between the first support ticket pertaining to the product until the time specified in the input datapoint, such that the calculated age of the product may be the aggregation of the time elapsed between the uptake of the product by each individual user until the time specified in the input datapoint. The system 100 can perform natural language processing to extract pertinent information from embedded text in the support tickets, or in customer relationship management data, such as the support ticket comments field and support ticket title field. For example, the system 100 can use natural language processing to extract useful information from raw text in support tickets, such as ticket counts and installation, maintenance, and upgrade activity-specific ticket counts. Products in the tail end of their lifecycle will incur less installation requests and more maintenance requests as compared to products at the beginning of their lifecycle.

The system 100 can analyze support ticket volumes by topic, such as installation, maintenance, and upgrade, and track their relative concentration over time. If a product's importance within customer environments is decreasing, the topic-normalized concentration of high-priority or high-severity support tickets will decrease. The system 100 can perform time series analysis on these computed counts by computing rolling window percentage changes on a per quarter and per year basis to capture temporal trends that indicate usage over time. The lag size of the rolling window can be altered as needed.

The system 100 can extract a count of the number of customers that generate support tickets for a product on a pre-configured frequency to quantify how widespread and active the usage of the product is and how the usage evolves over time. The system 100 can generate an effective ticket count, normalizing the nominal count with respect to customer count and age. For example, an older product might have generated more support tickets in a given quarter because the older product has been on sale longer, while a newer product may have begun generating support tickets only recently. Similarly, support tickets for older products might be generated from several unique customers, while a newer product might be used by relatively fewer customers.

The system 100 can operate by taking into account that a product's probability of deprecation depends on features including, but not limited to, the support ticket volume and associated temporal trends, the volume of installation and upgrade requests and associated trends, the comparative volume and trends of maintenance requests, the age of the product since release, the measures of diversity of customer uptake, and the severity/priority distributions in support ticket volumes. As a result, the system 100 can provide high-accuracy, data-driven results that allows companies to make informed decisions about when to deprecate a product.

Having identified support information, a predictive model uses the support information to predict a deprecation for the product. For example, the first predictive model 120 (or the second predictive model 122) uses the support tickets' information to estimate a 95% probability that the optimal deprecation for Acme's spreadsheet software version 5.0 will be in 9 to 12 months. For this example, the support tickets' information can include the estimated age of a product, the counts of the product's installation and upgrade activities, derived customer uptake metrics, temporal trends derived from time series analysis, and these features after normalization. Although this example describes a prediction that is based on the support information from support tickets, the system can also base the prediction on customer relationship management data and/or historical revenue numbers and revenue forecasts and their corresponding predicted per-unit profitability of the product. The deprecation for the product may include deprecation for support of the product. Deprecation can be advice against use of a product in the future so that the product may be phased out. Support can be assistance.

Once the derived features are computed for the given datapoint, the system 100 can use a predictive model to generate a deprecation score, such as a deprecation score that ranges between 0 and 100, with 100 indicating the maximum probability of deprecation within the period of projection (such as the next four quarters). The system 100 can use machine-learning to create a predictive model, and as is apparent to those skilled in the art, the features described above can be fed into a variety of predictive models including, but not limited to, a gradient boosting classifier, a k-nearest neighbor classifier, a neural network, a random forest, a support-vector machine, a naive Bayes classifier, or a logistic regression. As an example, a gradient boosting classifier can be used as a predictive model.

Machine learning can be the study of a statistical model that a computer system uses to perform a task by relying on patterns and inference instead of by using explicit instructions. A predictive model can be a mathematical description of a system or process that assists in estimating that a specified thing will happen in the future. A gradient boosting classifier can be a machine-learning technique for category identification problems, which produces a prediction model in the form of an ensemble of weak prediction models. A k-nearest neighbor classifier can be a non-parametric method used for category identification. A neural network can be a circuit of artificial neurons for solving artificial intelligence problems.

A random forest can be an ensemble learning method for regression or category identification that operates by constructing a multitude of decision trees at training time and outputting the mean prediction (regression) of the individual trees or the category that is the mode of the categories. A support-vector machine can be a supervised learning model with associated learning algorithms that analyze data used for regression analysis and category identification. A naive Bayes classifier can be a family of procedures that predict a probability distribution over a set of categories by applying a description of the probability of an event, based on prior knowledge of conditions that might be related to the event, with strong independence assumptions between the features. A logistic regression can be a statistical model that uses a sigmoid curve to model a binary dependent variable.

The predictive model training procedure can consist of extracting the features described above from a company-specific dataset, and of extracting a corresponding response that is a flag which indicates a product's deprecation within a specified subsequent time period, such as the following 12 months. Since this data keeps accruing over time for a given company based on the different products released and then transitioned to the end-of-life status, a predictive model that is trained on older data can become stale over time. Consequently, as new data is gathered and underlying relationships between features evolve, a predictive model can be retrained periodically, such as every month or every quarter. This retraining can enable a predictive model to remain up to date and capture all the variations in incoming data that might be newly introduced or that have undergone distributional shifts. In order to bootstrap the training of such a predictive model, profiles of similar or closely related products from the open source community can be used as training data. As an extension, the system 100 can provide normative advice to product teams and help guide their decisions on what products to prioritize for engineering resource allocation. Even if a new company has only a limited number of support tickets that provide a limited amount of support information about a new product, the system 100 can use a predictive model that is trained on a family of products that are related to the new product to predict deprecation for the new product.

Predicting the deprecation for a product may include predicting a probability that a time period of deprecation for the product includes an optimal time period of deprecation for the product, or predicting the optimal time period of deprecation for the product. For example, the first predictive model 120 (or the second predictive model 122) uses the support tickets' information to estimate a 35% probability that the optimal deprecation for Acme's spreadsheet software version 5.0 will be within 12 months, and a 65% probability that the optimal deprecation for Acme's spreadsheet software version 5.0 will be in 12 to 15 months. A probability can be the likelihood of something happening or being the case. A time period can be a space of seconds, minutes, hours, days, weeks, months, or years with an established beginning and ending. An optimal time period can be a space of seconds, minutes, hours, days, weeks, months, or years with an established beginning and ending, which is most favorable for something.

Predicting a deprecation for a product can be scheduled to occur periodically. For example, each month after estimating a 35% probability that the optimal deprecation for Acme's spreadsheet software version 5.0 will be within 12 months, and a 65% probability that the optimal deprecation for Acme's spreadsheet software version 5.0 will be in 12 to 15 months, the first predictive model 120 generates another estimate, such as one month later generating an estimate of a 45% probability that the optimal deprecation for Acme's spreadsheet software version 5.0 will be within 12 months, and a 55% probability that the optimal deprecation for Acme's spreadsheet software version 5.0 will be in 12 to 14 months.

After predicting the deprecation for the product, the system 100 outputs the prediction of the deprecation for the product. For example, the prediction server 116 outputs the prediction of a 95% probability that the optimal deprecation for Acme's spreadsheet software version 5.0 will be in 9 to 12 months, and outputs an explanation that the prediction of deprecation farther into the future than expected is based on the unusually large number of support tickets for spreadsheet software 15 months after being installed for individual users at BigBiz and MegaCorp, even though the requested priority for these support tickets is slightly less than expected. A prediction can be an estimate of a consequence for something.

The result of a predictive model may be stored by the system 100 and may be queried via REST endpoints or made accessible via a user interface. The system 100 can provide, for each prediction, an associated list of factors ranked by importance that explain why the predictive model has assigned a particular score to the corresponding input datapoint. The list of factors can be generated using a process that analyzes localized predictions for perturbations around the input datapoint and computes predictive model-agnostic explanations for the prediction.

Using machine learning analysis procedures such as LIME (Local Interpretable Model-agnostic Explanations), the reasoning that leads to a particular prediction can be explained in terms of input features, allowing users make an informed decision by further evaluating the relevance of the underlying factors. For example, it is likely that certain factors may indicate that a product is ready for deprecation, while other factors may indicate that this is not the case. Providing information about these indications and contraindications can provide users with additional information to augment their decisions. Therefore, outputting the prediction of the deprecation for the product may include outputting any explanations for any factors that are the basis for the prediction of the time period of deprecation for the product including an optimal time period of deprecation for the product and any explanations for any factors that are not the basis for the prediction of the time period of deprecation for the product including the optimal time period of deprecation for the product. For example, outputting the prediction of a 95% probability that the optimal deprecation for Acme's spreadsheet software version 5.0 will be in 9 to 12 months includes outputting an explanation that the prediction of deprecation farther into the future than expected is based on the unusually large number of support tickets for spreadsheet software 15 months after being installed for individual users at BigBiz and MegaCorp. An explanation is also output that the prediction of deprecation farther into the future than expected is not based on the requested priority for these support tickets being slightly less than expected. An explanation can be a reason given for something. A factor can be an influence that contributes to a result. A basis can be the underlying foundation for an idea.

Outputting the prediction of the deprecation for the product can be scheduled to occur periodically. For example, each quarter after outputting the prediction of a 95% probability that the optimal deprecation for Acme's spreadsheet software version 5.0 will be in 9 to 12 months, the prediction server 116 outputs a prediction, such as one quarter later generating the prediction of a 98% probability that the optimal deprecation for Acme's spreadsheet software version 5.0 will be in 6 to 9 months.

Overall, it can be of critical importance to a company to know when the optimal time is to deprecate support for a product, which is especially true for a company managing a portfolio of products, each on a separate asynchronous release cycle. By combining information for technical support and product management, the system 100 can thus inform overall business strategy and guide decision making processes. Applying analytic approaches to predict deprecation of a product can provide significant cost-savings to companies. Companies that delay product deprecation decisions can incur costs on a variety of fronts. The longer a product is supported, the more the engineering work that is involved in maintaining the product, which can translate into paying for dedicated engineering resources that might be focused on other tasks, such as security updates and backports. Often, an older software product does not work with a newer software product or hardware platforms, or faces significant performance degradation, either of which can lead to customer dissatisfaction followed by disengagement and eventual customer churn.

The system 100 can use a hybrid approach of predictive as well as prescriptive modeling—the features that are derived for the predictive model can themselves be viewed as metrics that measure a product's health. If a product's revenue is no longer significantly greater than the marginal cost of maintenance, the supporting company may avoid making a purely financial/capital-based decision to deprecate the product if the metrics that measure a product's health indicate a high level of usage of the product, thereby avoiding customer dissatisfaction followed by disengagement and eventual customer churn due to premature deprecation of the product. Feedback loops can provide an additional dimension of analysis by incorporating these metrics to enrich managerial decision making. The system 100 can be queried as often as desired, enabling companies to consistently monitor a product's health. Based on the explanatory factors accompanying the output prediction, the system 100 can function as a prescriptive solution that tracks the health of a product on an ongoing basis, regardless of the fluctuations in the prediction and the numeric output.

Figure 2:
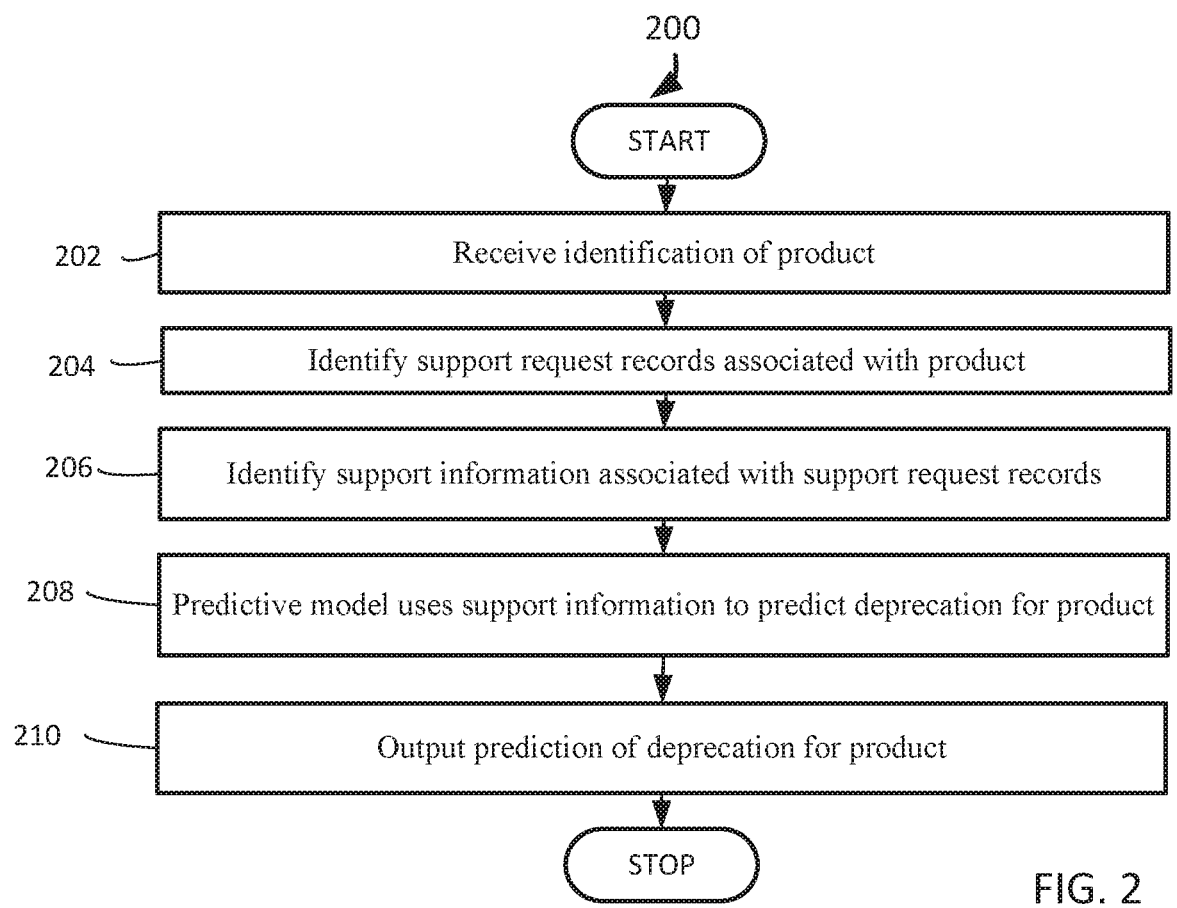
FIG. 2 is a flowchart that illustrates a computer-implemented method for predicting end-of-life support deprecation, under an embodiment.

FIG. 2 is a flowchart that illustrates a computer-implemented method for predicting end-of-life support deprecation, under an embodiment. Flowchart 200 depicts method acts illustrated as flowchart blocks for certain actions involved in and/or between the system elements 102-128 of FIG. 1.

An identification of a product is received, block 202. The system 100 receives a deprecation prediction request for a product. For example, and without limitation, this may include an administrator for Acme Corporation using the administrative client 110 to request a prediction of the optimal time to deprecate Acme's spreadsheet software version 5.0, and the prediction server 116 receiving this request.

After a product is identified, support request records associated with the product are identified, block 204. The system 100 identifies support tickets for a specified product. By way of example and without limitation, this may include the prediction server 116 identifying support tickets for Acme's spreadsheet software version 5.0, in the first set of customer request records 124, which Acme generated in response to support requests from the clients 102-104 for Acme's customer BigBiz and support requests from the clients 106-108 for Acme's customer MegaCorp.

Following the identification of support request records, support information associated with the support request records is identified, block 206. The system 100 identifies relevant information from a specified product's support tickets. In embodiments, this may include the prediction server 116 identifying support information from the metadata for the support tickets' timestamps and customer identifiers for Acme's spreadsheet software version 5.0, and also extracting support information from the support tickets about installations, upgrades, and maintenance of Acme's spreadsheet software version 5.0.

Having identified support information, a predictive model uses the support information to predict a deprecation for the product, block 208. A predictive model uses support ticket information for a product to predict its deprecation. For example, and without limitation, this may include the first predictive model 120 using the support tickets' information to estimate a 95% probability that the optimal deprecation for Acme's spreadsheet software version 5.0 will be in 9 to 12 months.

After predicting the deprecation for the product, the prediction of the deprecation for the product is output, block 210. The system 100 outputs a predicted deprecation for a product. By way of example and without limitation, this may include the prediction server 116 outputting the prediction of a 95% probability that the optimal deprecation for Acme's spreadsheet software version 5.0 will be in 9 to 12 months due to the unusually large number of support tickets for Acme's spreadsheet software version 5.0 that occurred 15 months after being installed for individual users at BigBiz and MegaCorp, even though the requested priority for these support tickets is slightly less than expected.

Although FIG. 2 depicts the blocks 202-210 occurring in a specific order, the blocks 202-210 may occur in another order. In other implementations, each of the blocks 202-210 may also be executed in combination with other blocks and/or some blocks may be divided into a different set of blocks.

Figure 3:
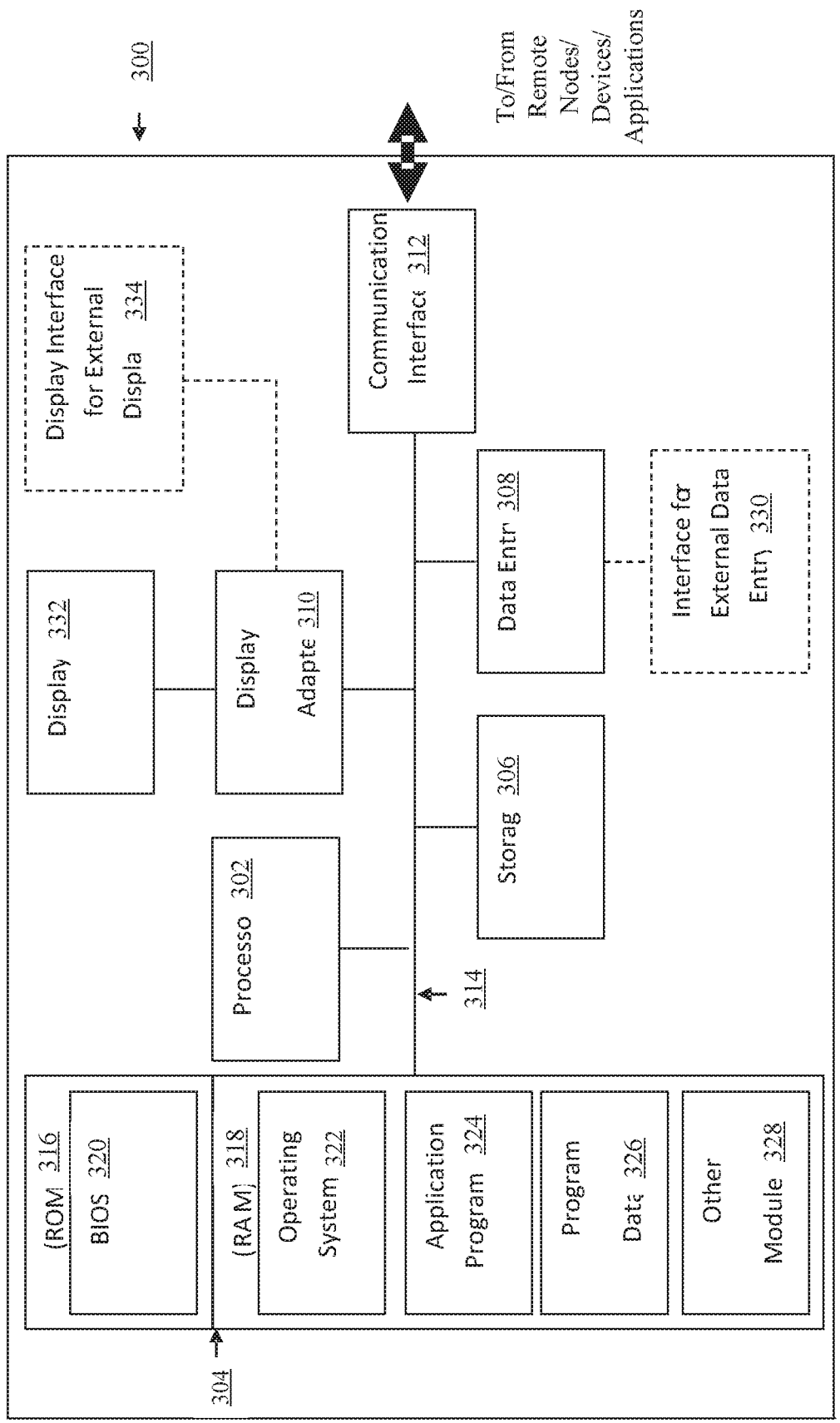
FIG. 3 is a block diagram illustrating an example hardware device in which the subject matter may be implemented.

An exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, a memory 304, a storage 306, a data entry module 308, a display adapter 310, a communication interface 312, and a bus 314 that couples elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include a read only memory (ROM) 316 and a random access memory (RAM) 318. The memory 304 may be configured to store program instructions and data during operation of the hardware device 300. In various embodiments, the memory 304 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which may store data that is accessible by a computer, such as magnetic cassettes, flash memory cards, digital video disks, Bernoulli cartridges, RAM, ROM, and the like may also be used in the exemplary operating environment. As used here, a "computer-readable medium" may include one or more of any suitable media for storing the executable instructions of a computer program in one or more of an electronic, magnetic, optical, and electromagnetic format, such that the instruction execution machine, system, apparatus, or device may read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via the external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the descriptions above, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in a context, it is not meant to be limiting as those of skill in the art will appreciate that various of the acts and operations described hereinafter may also be implemented in hardware.

To facilitate an understanding of the subject matter described above, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for predicting end-of-life support deprecation, the system comprising:
   one or more processors; and
   a non-transitory computer readable medium storing a plurality of instructions, which when executed, cause the one or more processors to:
   create and train a machine-learning predictive model to predict optimal time periods for phasing out support for versions of products;
   identify support request records, in response to receiving an identification of the version of the product, the support request records being for both a version of a product and for other products associated with the product, the support request records being stored at different network locations;
   identify, by using natural language processing, support information associated with the support request records that comprise written text exchanged between customers who are either end users of the version of the product or end users of the other products and support agents who support either the version of the product or the other;
   cause an initial prediction by the machine learning predictive model of an optimal time period for phasing out support for the version of the product, the prediction being based on the support information; and
   output the initial prediction of the optimal time period for phasing out support for the version of the product and an explanation for the prediction that lists factors involved in generating the initial prediction by the predictive model, the initial prediction and the explanation being displayed on a user interface;
   retrain recursively the machine-learning predictive model in response to receiving newly accrued support request records;
   cause a subsequent updated prediction by the retrained machine-learning predictive model of another optimal time period for phasing out support for the version of the product, the subsequent updated prediction being in response to support information associated with the newly received support request records; and output the subsequent updated prediction of the other optimal time period for phasing out support for the version of the product.

2. The system of claim 1, wherein the version of the product comprises at least one of a software product, a medical device product, a consumer electronics product, and a technical product.

3. The system of claim 1, wherein the support request records associated with the version of the product comprise at least one of support request records generated for the version of the product and support request records generated for another product that is associated with the version of the product.

4. The system of claim 1, wherein the support information comprises at least one of metadata associated with the support request records, the metadata comprising at least one of an identifier of a customer of the version of the product and a time associated with generating a support request record, and content extracted from the support request records, the content comprising information associated with at least one of an identifier of an individual user of the version of the product, a product version installation, a product version upgrade, product maintenance, and a support request priority.

5. The system of claim 1, wherein the trained machine-learning predictive model comprises one of a gradient boosting classifier, a k-nearest neighbor classifier, a neural network, a random forest, a support-vector machine, a naive Bayes classifier, or a logistic regression.

6. The system of claim 1, wherein predicting the optimal time period for phasing out support for the version of the product is scheduled to occur periodically and comprises predicting a probability that a time period for phasing out support for the version of the product comprises the optimal time period for phasing out support for the version of the product.

7. The system of claim 1, wherein outputting the prediction of the optimal time period for phasing out support for the version of the product is scheduled to occur periodically and comprises outputting any explanations for any factors that are the basis for a prediction of a time period for phasing out support for the version of the product comprising the optimal time period for phasing out support for the version of the product, and any explanations for any factors that are not the basis for the prediction of the time period for phasing out support for the version of the product comprising the optimal time period for phasing out support for the version of the product.

8. A computer-implemented method for predicting end-of-life support deprecation, the method comprising:

creating and training a machine-learning predictive model to predict optimal time periods for phasing out support for versions of products;

identifying support request records, in response to receiving an identification of the version of the product, the support request records being for both a version of a product and for other products associated with the product, the support request records being stored at different network locations;

identifying, by using natural language processing, support information associated with the support request records that comprise written text exchanged between customers who are either end users of the version of the product or end users of the other products and support agents who support either the version of the product or the other products;

predicting, by the retrained machine-learning predictive model, an optimal time period for phasing out support for the version of the product, the prediction being based on the support information;

outputting the prediction of the optimal time period for phasing out support for the version of the product and an explanation for the prediction that lists factors involved in generating the prediction by the predictive model, the prediction and the explanation being displayed on a user interface;

retraining recursively the machine-learning predictive model in response to receiving newly accrued support request records;

causing a subsequent updated prediction by the retrained machine-learning predictive model of another optimal time period for phasing out support for the version of the product, the subsequent updated prediction being in response to support information associated with the newly received support request records; and outputting the subsequent updated prediction of the other optimal time period for phasing out support for the version of the product.

9. The computer-implemented method of claim 8, wherein the version of the product comprises at least one of a software product, a medical device product, a consumer electronics product, and a technical product.

10. The computer-implemented method of claim 8, wherein the support request records associated with the version of the product comprise at least one of support request records generated for the version of the product and support request records generated for another product that is associated with the version of the product.

11. The computer-implemented method of claim 8, wherein the support information comprises at least one of metadata associated with the support request records, the metadata comprising at least one of an identifier of a customer of the version of the product and a time associated with generating a support request record, and content extracted from the support request records, the content comprising information associated with at least one of an identifier of an individual user of the version of the product, a product version installation, a product version upgrade, product maintenance, and a support request priority.

12. The computer-implemented method of claim 8, wherein the trained machine-learning predictive model comprises one of a gradient boosting classifier, a k-nearest neighbor classifier, a neural network, a random forest, a support-vector machine, a naive Bayes classifier, or a logistic regression.

13. The computer-implemented method of claim 8, predicting the optimal time period for phasing out support for the version of the product is scheduled to occur periodically and comprises predicting a probability that a time period for phasing out support for the version of the product comprises the optimal time period for phasing out support for the version of the product.

14. The computer-implemented method of claim 8, wherein outputting the prediction of the optimal time period for phasing out support for the version of the product is scheduled to occur periodically and comprises outputting any explanations for any factors that are the basis for a prediction of a time period for phasing out support for the version of the product comprising the optimal time period for phasing out support for the version of the product, and any explanations for any factors that are not the basis for the prediction of the time period for phasing out support for the version of the product comprising the optimal time period for phasing out support for the version of the product.

15. A computer program product, comprising a non-transitory computer-readable medium having a computer-readable program code embodied therein to be executed by one or more processors, the program code including instructions to:
- create and train a machine-learning predictive model to predict optimal time periods for phasing out support for versions of products;
- identify support request records, in response to receiving an identification of the version of the product, the support request records being for both a version of a product and for other products associated with the product, the support request records being stored at different network locations;
- identify, by using natural language processing, support information associated with the support request records that comprise written text exchanged between customers who are either end users of the version of the product or end users of the other products and support agents who support either the version of the product or the other;
- predict, by the retrained machine-learning predictive model, an optimal time period for phasing out support for the version of the product, the prediction being based on the support information; and
- output the prediction of the optimal time period for phasing out support for the version of the product and an explanation for the prediction that lists factors involved in generating the prediction by the predictive model, the prediction and the explanation being displayed on a user interface;
- retrain recursively the machine-learning predictive model in response to receiving newly accrued support request records;
- cause a subsequent updated prediction by the retrained machine-learning predictive model of another optimal time period for phasing out support for the version of the product, the subsequent updated prediction being in response to support information associated with the newly received support request records; and
- output the subsequent updated prediction of the other optimal time period for phasing out support for the version of the product.

16. The computer program product of claim 15, wherein the version of the product comprises at least one of a software product, a medical device product, a consumer electronics product, and a technical product.

17. The computer program product of claim 15, wherein the support request records associated with the version of the product comprise at least one of support request records generated for the version of the product and support request records generated for another product that is associated with the version of the product, and the support information comprises at least one of metadata associated with the support request records, the metadata comprising at least one of an identifier of a customer of the version of the product and a time associated with generating a support request record, and content extracted from the support request records, the content comprising information associated with at least one of an identifier of an individual user of the version of the product, a product version installation, a product version upgrade, product maintenance, and a support request priority.

18. The computer program product of claim 15, wherein the trained machine-learning predictive model comprises one of a gradient boosting classifier, a k-nearest neighbor classifier, a neural network, a random forest, a support-vector machine, a naive Bayes classifier, or a logistic regression.

19. The computer program product of claim 15, w predicting the optimal time period for phasing out support for the version of the product is scheduled to occur periodically and comprises predicting a probability that a time period for phasing out support for the version of the product comprises the optimal time period for phasing out support for the version of the product.

20. The computer program product of claim 15, wherein outputting the prediction of the optimal time period for phasing out support for the version of the product is scheduled to occur periodically and comprises outputting any explanations for any factors that are the basis for a prediction of a time period for phasing out support for the version of the product comprising the optimal time period for phasing out support for the version of the product, and any explanations for any factors that are not the basis for the prediction of the time period for phasing out support for the version of the product comprising the optimal time period for phasing out support for the version of the product.

* * * * *